US00RE42884E

(19) United States
(12) Reissued Patent
Wang et al.

(10) Patent Number: US RE42,884 E
(45) Date of Reissued Patent: Nov. 1, 2011

(54) TURBO DECODING SYSTEM USING NTH ROOT METRICS FOR NON-GAUSSIAN COMMUNICATION CHANNELS

(75) Inventors: Charles C. Wang, Alhambra, CA (US); Dean J. Sklar, Chatsworth, CA (US)

(73) Assignee: The Aerospace Corporation, El Segundo, CA (US)

(21) Appl. No.: 12/289,216

(22) Filed: Oct. 22, 2008

Related U.S. Patent Documents

Reissue of:
(64) Patent No.: 7,127,000
Issued: Oct. 24, 2006
Appl. No.: 10/277,039
Filed: Oct. 21, 2002

(51) Int. Cl.
*H04L 27/22* (2006.01)

(52) U.S. Cl. ..... 375/265; 375/329; 375/324; 375/341

(58) Field of Classification Search ..... 375/259–262, 375/322, 324, 329, 340, 341, 265
See application file for complete search history.

(56) References Cited

U.S. PATENT DOCUMENTS 5,640,429 A * 6/1997 Michels et al. ..... 375/340
6,473,449 B1 * 10/2002 Cafarella et al. ..... 375/141
6,904,555 B2 * 6/2005 Nagase et al. ..... 714/751

* cited by examiner

*Primary Examiner* — David Lugo
(74) *Attorney, Agent, or Firm* — Connolly Bove Lodge & Hutz LLP

(57) ABSTRACT

An nth root transformation is used for generating near Gaussian metrics from non-Gaussian metrics for input into a conventional turbo decoder that is based on the assumption that the input sequence to the decoder has a Gaussian distribution. The nth root transformation transforms channel non-Gaussian statistics to near Gaussian statistics for use with conventional turbo decoding for improved noncoherent communications over a non-Gaussian channel, such as a fading channel. For a differential coherent PSK waveform, where the channel statistics of a demodulator are non-Gaussian, for example, in the presence of fading, the nth root transformation is used to transform the non-Gaussian statistics to near Gaussian statistics for generating near Gaussian metrics, for improved PSK communications.

27 Claims, 3 Drawing Sheets

$N^{th}$ ROOT METRIC TURBO DECODER SYSTEM $N^{th}$ ROOT METRIC TURBO DECODER SYSTEM

HISTOGRAM OF DECODER INPUT (PRIOR ART)

SQUARE ROOT HISTOGRAM OF DECODER INPUT

BIT ERROR RATE GRAPH

TURBO DECODING SYSTEM USING NTH ROOT METRICS FOR NON-GAUSSIAN COMMUNICATION CHANNELS

Matter enclosed in heavy brackets [ ] appears in the original patent but forms no part of this reissue specification; matter printed in italics indicates the additions made by reissue.

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of turbo decoding communication systems. More particularly, the present invention relates to soft metric formulations in turbo decoding systems for improved performance for non-Gaussian communications channels.

BACKGROUND OF THE INVENTION

Turbo decoding in a receiving communication system is based on the concept of maximum a posteriori probability of bit decisions made on blocks of channel symbols communicated over a communication channel from a turbo encoding transmitting communication system. Conventional turbo-decoding algorithms are based on the assumption that the input sequence to the turbo decoder has been disturbed by a noise process that has a Gaussian distribution. Conventional turbo-decoding algorithms are optimized for Gaussian channels for reducing the bit-error-rate (BER). Conventional turbo decoders are equipped with a decoder reference for providing a mean and a standard deviation as an estimate of the assumed Gaussian channel statistics. However, when the actual channel statistics of the input sequence to the decoder varies significantly from the Gaussian distribution assumption, the turbo decoder performance will degrade. Hence, the conventional turbo-decoding algorithm incorrectly assumes a Gaussian channel in all cases. A coherently demodulated signal will preserve channel statistics in a turbo decoding system. When the channel is non-Gaussian, the conventional turbo-decoding algorithm suffers degraded performance with a reduced BER. Often, the input sequences to the turbo decoder exhibits non-Gaussian statistics, such that, there will be a mismatch between likelihood values assumed by the decoder and the actual likelihood values presented by non-Gaussian channels. This mismatch produces degradation when using decoding from metrics generated from noncoherently demodulated signals, such as with differentially coherent phase shift keying (DPSK) signals. The performance degradation will also occur from channel disturbances with channel memory, such as from fading, regardless of the demodulation method. Hence, the turbo decoding performance suffers with a reduced BER in the presence of a mismatch between the assumed Gaussian channel without fading and a non-Gaussian channel, such as, a Gaussian channel with fading. For DPSK signaling, the output statistics of a differentially coherent demodulator is non-Gaussian. When a metric sequence from a differentially coherent demodulator is fed directly into a conventional turbo decoder, particularly under a fading environment, the mismatch between decoder algorithm assumptions and actual input statistics can result in significant decoder performance degradation.

Referring to prior art FIG. 2, a prior art non-Gaussian M1 histogram of the random variable $r_k$ that may be a detected signal in a fading environment is compared to an M1 decoder reference histogram having a Gaussian distribution. The M1 decoder reference is conditioned on the hypothesis that a decoder input value of a +1 data bit was transmitted. The +1 data bit has a mean input value equal to one. The M1 non-Gaussian probability histogram has a normalized height to the M1 decoder reference Gaussian histogram. The M1 histograms are measured at an average received $E_b/N_0$, such as 10 dB. Channel side information of the M1 decoder reference, typically expressed in the form of average bit signal-to-noise ratio (SNR), is provided to the turbo decoder as a reference for characterizing the noise variance of the assumed Gaussian statistics at the input to the decoder. Under some channel conditions, the BER performance can be improved by applying a fixed bias to the channel side information of the M1 decoder reference obtained from the average SNR. The mismatch between the M1 decoder reference Gaussian histogram and the M1 non-Gaussian histogram reduces turbo decoding performance. As the mismatch grows, the BER increases.

Although optimum decoder performance for a non-Gaussian channel can be achieved by modifying the decoder reference based on the actual input statistics to the turbo decoder for various respective channel statistics, such modifications would only be effective for channel statistics having a Gaussian distribution. To correctly match non-Gaussian channel statistics, the turbo decoder algorithm would need to be modified to match metric processing to the non-Gaussian distribution. Such a redevelopment would only be effective during predetermined fading and predetermined noncoherent demodulation methods, and may not be suitable for a steady state Gaussian channel or other non-Gaussian channels. These and other disadvantages are solved or reduced using the invention.

SUMMARY OF THE INVENTION

An object of the invention is to provide improved communications over non-Gaussian communication channels.

Another object of the invention is to provide an nth root metric transformation in a turbo decoding system.

Yet another object of the invention is to provide an nth root metric transformation in a turbo decoding system for matching non-Gaussian channel statistics to Gaussian metric processing of a turbo decoder.

Still another object of the invention is to provide an nth root metric transformation in a turbo decoding system for matching non-Gaussian channel statistics to Gaussian metric processing in a turbo decoder system demodulating phase shift keying (PSK) received signals.

A further object of the invention is to provide an nth root metric transformation in a turbo decoding system for matching non-Gaussian channel statistics to Gaussian metric processing in a turbo decoder system demodulating differential phase shift keying (DPSK) received signals.

Yet a further object of the invention is to provide an nth root metric transformation in a turbo decoding system for matching non-Gaussian channel statistics to Gaussian metric processing in a turbo decoder system demodulating binary phase shift keying (BPSK) received signals.

The invention is directed to turbo decoding communication systems for matching non-Gaussian statistics to turbo decoding Gaussian metric processing by an nth root transformation of the non-Gaussian metric inputs into Gaussian metrics inputs prior to turbo decoding. The nth root transformation of the non-Gaussian metrics effectively shifts the probability histogram functions to near Gaussian metrics for use in a conventional turbo decoder Gaussian metric processing algorithm for improved performance in the presence of non-Gaussian channel statistics, such as those resulting from fading and multipath. The nth root transformation is applied independent of the turbo decoding and hence can be retrofitted into existing turbo decoding systems. The nth root transformation transforms non-Gaussian statistics into near Gaussian that largely resembles a true Gaussian distribution. The near Gaussian distribution would have a different mean, different standard deviation, and a slightly different shape, but in the general appearance of a bell shaped distribution. The decoder reference has side channel information indicating the standard deviation and mean that are modified to match the near Gaussian distribution generated by the nth root transformation of the non-Gaussian statistics. In this manner, an improvement in turbo decoder performance, and hence an improvement in the bit error rate (BER) performance, can be achieved in the presence of non-Gaussian channel statistics using a conventional turbo decoder and using an effective biased Gaussian distribution as indicated by the channel side information.

Conventional turbo decoding can now be used to communicate over a fading channel communicating DPSK signals. In a receiver, the DPSK demodulator output statistics would still exhibit a large deviation from a Gaussian distribution. The non-Gaussian distribution is effectively transformed for improved decoder performance in fading channels by altering the statistics of the demodulated sequence, through nth root signal transformation, so that the channels then appears to be near Gaussian for subsequent conventional turbo decoding with biased side information. That is, the nth root transformation provides near Gaussian turbo decoding metrics for conventional turbo decoding. By using the transformed metric inputs, with quantized input soft metric values, to the conventional turbo decoder, the BER performance in fading conditions is improved. These and other advantages will become more apparent from the following detailed description of the preferred embodiment.

DETAILED DESCRIPTION OF THE PREFERRED EMBODIMENT

Figure 1:
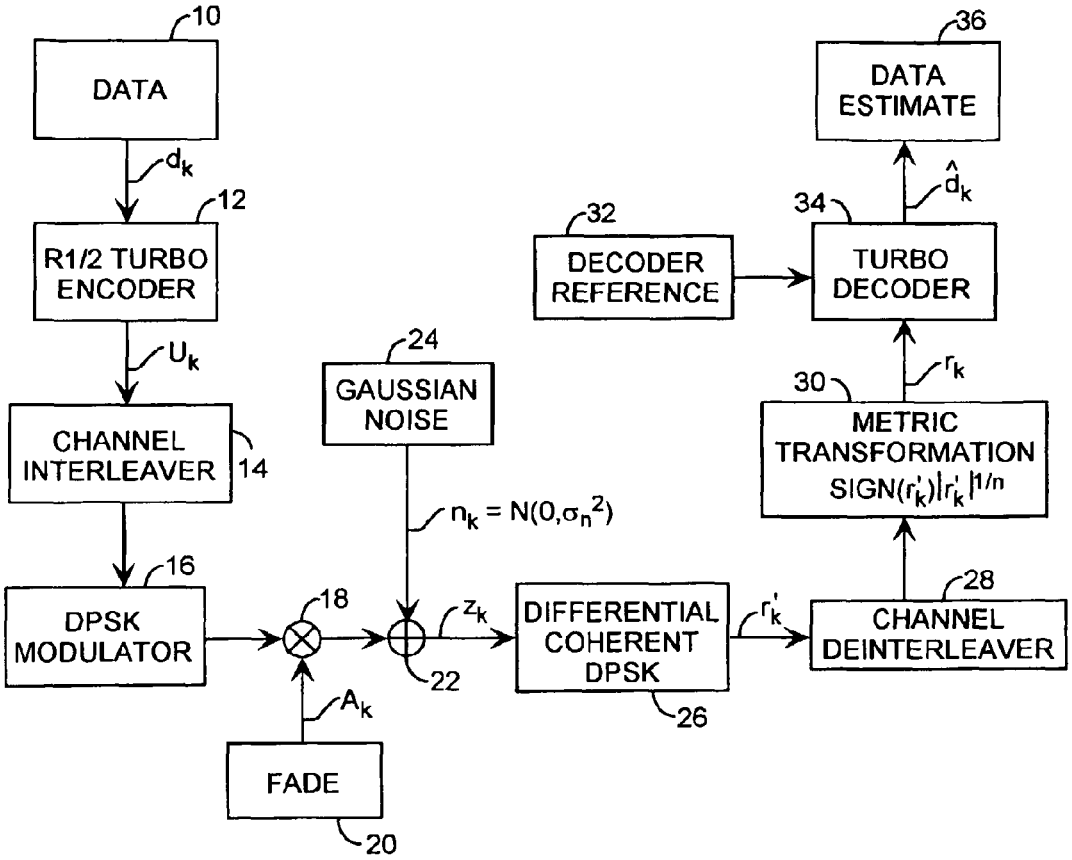
FIG. 1 is a block diagram of an Nth root metric turbo decoder system.

An embodiment of the invention is described with reference to the figures using reference designations as shown in the figures. Referring to FIG. 1, a cascaded channel structure is used as a model for a turbo decoder communication system. The system is an nth root metric turbo decoder system that communicates an incoming $d_k$ data stream 10. The data stream is fed into an rate one-half R(½) turbo encoder 12 providing an encoded stream $U_k$ to an interleaver 14 and modulator 16 providing a transmission signal. Encoding the information symbols, $d_k$, can be accomplished using the rate one-half R(½) turbo encoder 12, that may for example, have two recursive systematic encoders in a parallel concatenated configuration with an S-random interleaver, not shown, that is used to separate the input bits of the two component encoders 12.

The transmission signal is fed through a communication channel that may be a non-Gaussian channel. The Gaussian channel noise can be modeled by $n_k$ samples of a Gaussian distribution $N(0, \sigma_n^2)$ where $\sigma$ is the standard deviation, 0 is the mean, and N indicates a normal Gaussian distribution. A mixer 18 mixes fading effects from a fading source 20 with the transmitted signal, that is then also mixed by a mixer 22 with Gaussian noise 24 for providing the faded noisy signal $z_k$ that has non-Gaussian statistics. The communication channel is characterized by a bit error rate (BER). The BER is the figure of merit used to represent the performance of the communication channel. A communication channel using noncoherent demodulation in the presence of fading will have a reduced BER with non-Gaussian statistics. One such noncoherent demodulation is differential coherent PSK demodulation. A differential coherent phase shift keying (DPSK) demodulator 26 demodulates the detected signal $z_k$ into $r_k'$ demodulated metrics that are updated every symbol time. Fading on the channel can be characterized as a correlated disturbance with coherence time $\tau_c$. The channel interleaver 14 and deinterleaver 28 are used to transform channel fading-induced correlated corruption into independently corrupted symbols, which in turn, can be effectively corrected by a forward error correcting code after deinterleaving. Hence, for improved performance, a channel deinterleaver 28 is used to deinterleave the differentially demodulated sequence $r_k'$ having a non-Gaussian metric sequence, that is then transformed by a metric transformation 30 for providing a near Gaussian metric sequence, $r_k$, having a distribution that approximately yields a Gaussian probability density function. The exemplar transformation 30 is $SIGN(r_k')|r_k'|^{1/n}$ where n is the nth root, and where $r_k'$ has non-Gaussian statistics and the resulting $r_k$ sequence has near Gaussian statistics. The root n is a transformation index. A mean value and standard deviation for the decoder reference 32 is then derived from the statistics of the $r_k$ near Gaussian metrics that can be used to specify the Gaussian decoder reference to the turbo decoder 34 that best matches the actual input statistics of the near Gaussian metric sequence $r_k$ for providing an $\hat{d}_k$ data estimate 36 of the original $d_k$ data stream 10. Multiple iterations, such as ten iterations, may be performed during turbo decoding prior to making hard decisions to obtain an estimate of the original information sequence $\hat{d}_k$ 36. The demodulated sequence, $r_k'$, can be described from the detected channel sequence, $z_k$, as $r_k'=x_{k-1}x_k$, where, $x_k=Re\{z_k\}$ and $Y_k=Im\{z_k\}$, and $Z_k=A_kS_ke^{j\Phi}n_k^c+jn_k^s$. The term $A_k$ is the fade sample, and the term $\phi$ is a random phase, for simulation purposes, and $n_k^c$ and $n_k^s$ are independent zero-mean normally, that is Gaussian, distributed random variables with variance $\sigma_n^2$. Without loss of generality, for a signal with unity amplitude, that is, $|s_k|=1$ for all values of k, the variance $\sigma_n^2$ can be written as $1/(2E_s/N_o)$, where, $E_s/N_o=(½)(E_b/N_o)$ for a rate R(½) turbo encoded communication system. The channel can then be modeled and then simulated for determining simulated BERs. To model a fading channel, a Rayleigh probability density function of accumulated fading samples $A_k$ may be used to statistically represent the magnitude of the received and detected signal $z_k$ under the assumption that the signal samples are uncorrelated. In a fading environment however, without the use of an interleaver, received channel symbols can be highly correlated. Hence, the Rayleigh model is valid only for systems having an interleaver with an infinite time span. For practical implementations, a compromise is made between the interleaver time span, $T_s$, and the allowable interleaver delay. There is a limited degree of independence between channel symbols as characterized by $T_s/\tau_c$, which is the ratio of interleaver span $T_s$ which is an interleaver time delay over the coherence time of the channel $\tau_c$. Generally, the performance in a fading channel is dependent on the ratio $T_s/\tau_c$ rather than the absolute values of $T_s$ and $\tau_c$. The larger the ratio $T_s/\tau_c$, the less the correlation among the deinterleaved symbols, and hence, the better the performance. Hence, the channel model should contain interleaving with a large $T_s/\tau_c$ ratio as practical for performance simulations.

Figure 2:
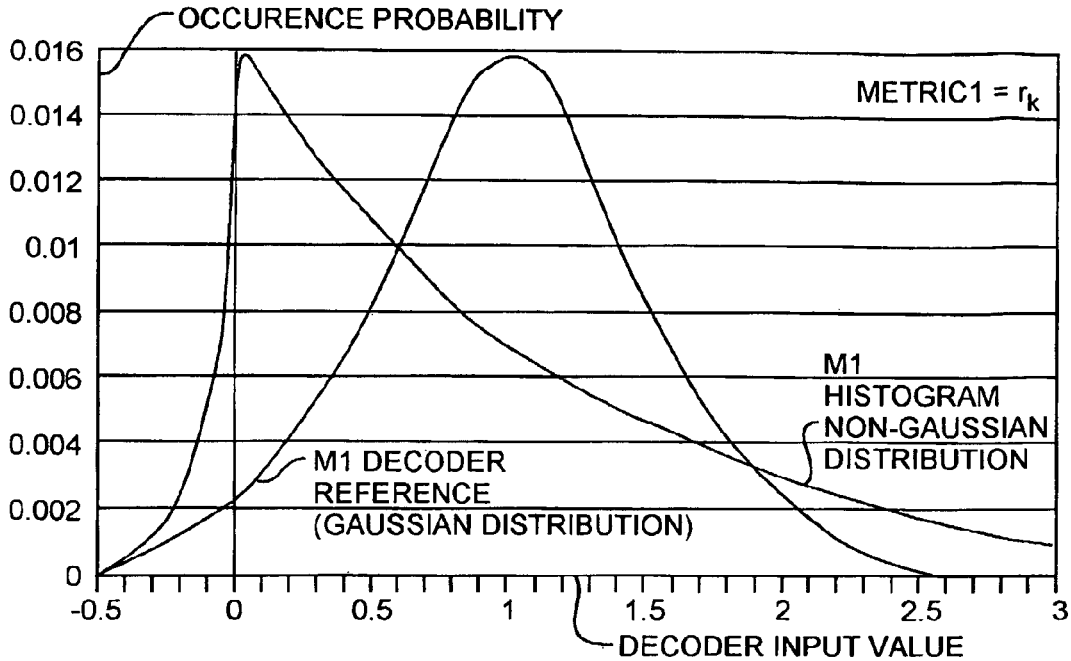
FIG. 2 is a histogram of a prior art decoder input.
Figure 3:
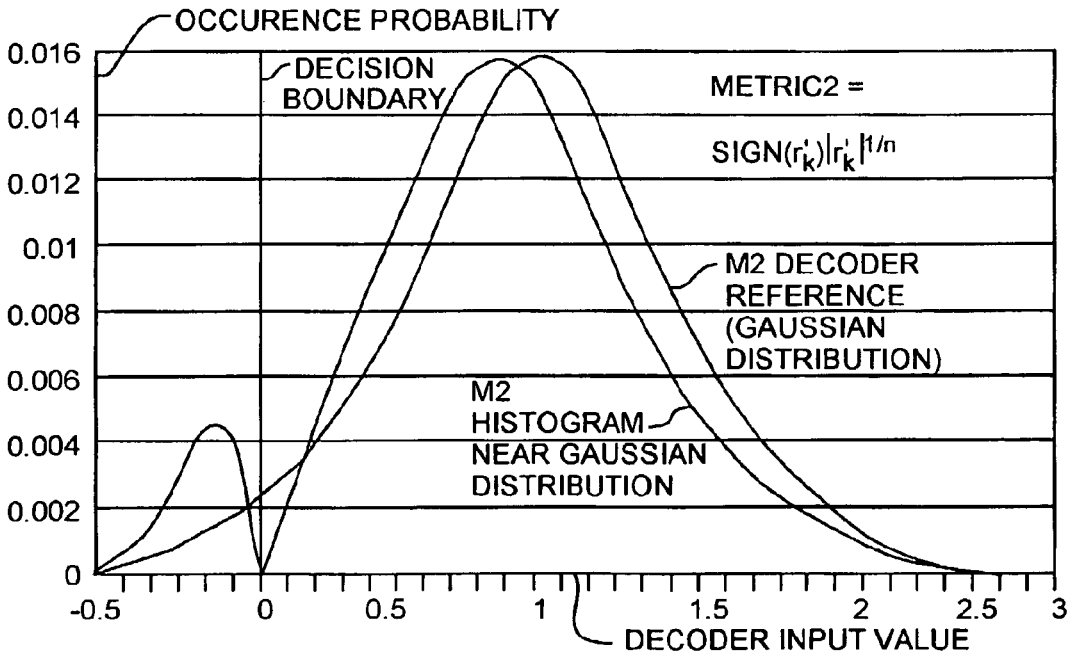
FIG. 3 is a square root histogram of the decoder input.

Referring to FIGS. 1 and 3, and more particularly to FIG. 2, a turbo decoder is modified with a modified M2 decoder reference 32 providing an M2 Gaussian decoder reference and with a square root transformation 30. The transformation 30 produces an M2 near Gaussian Histogram using an n=2 value for the transformation index n, for a square root transformation. The M2 histograms of FIG. 3 can be compared to the prior M1 histogram of FIG. 2. The M1 histogram can be generated using an index value of n=1. Hence, the indices n=1 and n=2 correspond to the two metric transformations designated as M1 and M2, respectively. Where n is an infinite root, the transformation process is a conventional hard limiter transformation. Where n=1, the output of the DPSK demodulator, $r_k'$, forms the input to the turbo decoder without any transformation, as in the prior art using the conventional assumption that the channel is Gaussian. For a fixed SNR, the probability mass on either side of the decision boundary remains the same regardless of any signal transformations used. However, for DPSK in fading channels, to generate decoder input statistics that closely approximate a Gaussian, as near Gaussian, the metric transformation parameter is a positive integer greater than 1. As the transformation index n increases, the actual distribution on either side of the vertically extending zero decision boundary becomes more normally, that is Gaussian, distributed with increasing height, decreasing variance, and with a peak value approaching unity. In the limit, as n gets very large, the transformation becomes that of a hard-limiter with unity output values. At a 10 db value for $E_b/N_0$, the probability that the demodulated symbol is on the correct side of the decision boundary is equal to 0.92 and the probability of an error is equal to 0.08. There is some value n that nearly matches the detected sequence to a Gaussian sequence. For different channel characteristics, such as, amount of fading, noise distribution, multipath, demodulation scheme, and for different SNRs, a different n can be used to create a near Gaussian distribution for improved performance. Channel BERs could be monitored and values of the index n for the transformation 30, and the standard deviation $\sigma$, and mean, for the decoder reference 32, can be adaptively adjusted towards improving BERs.

Decoder performance degradation occurs any time that there exists a mismatch between the likelihood values assumed by the decoder based on the Gaussian decoder reference 32 and the actual likelihood values from the input statistics from the demodulator 26. As the value of n increases, a migration mechanism also occurs causing further BER degradation. The magnitude of the decoder input value that occurs on the incorrect or left side of the decision boundary shifts away from the zero value decision boundary. The further away from the decision boundary that the metric is located, the more reliable the decoder 34 indicates the demodulated value to be. Severe decoder performance degradation will occur when demodulated symbols on the incorrect side of the decision boundary have large magnitudes. This is because these symbols will be associated with large values of erroneous reliability that affect the decoding decisions of current and future bits.

Figure 4:
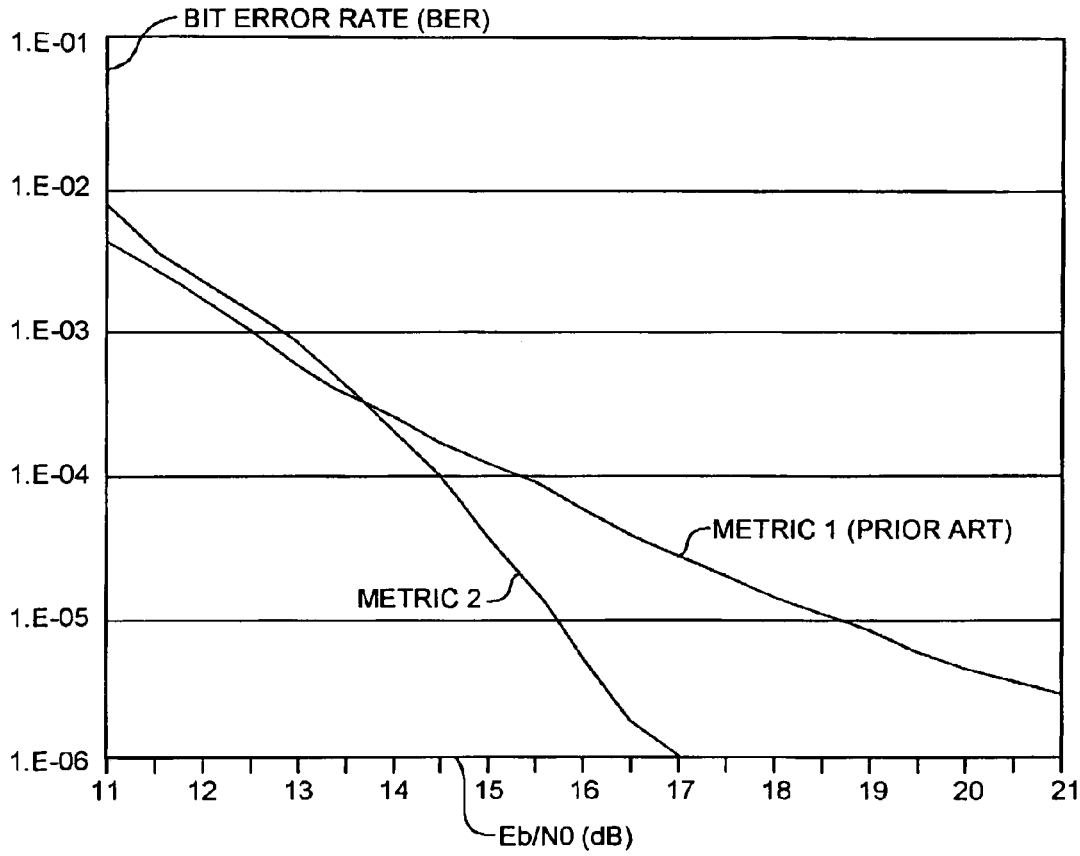
FIG. 4 is a bit error rate graph.

Referring to all of the Figures, and more particularly to FIG. 4, the M2 decoder reference system will outperform the M1 decoder reference system at high SNRs. For decreasing SNR, the channel symbol error rate increases and, thus, the probability mass on the left side of the decision boundary is greater. For this situation, the erroneous reliability given to demodulated values on the left or incorrect side of the decision boundary has a more detrimental effect on decoder performance than does the overall decoder reference mismatch to a Gaussian distribution. Thus, the BER performance using transformation M2 is worse than that using M1 when the $E_b/N_0$ is less than 13.5 dB because increasing n causes a migration of the probability mass further away from the decision boundary. As the SNR increases, the probability mass on the left side of the decision boundary diminishes, thus reducing the influence on decoder degradation caused by this migration mechanism. Also, as SNR increases, the actual probability mass on the right correct side of the decision boundary exhibits a better match to the Gaussian decoder reference. Thus, for an $E_b/N_0$ greater than 13.5 dB, the M2 decoder reference with n=2 improves the performance over the M1 decoder reference with n=1. Hence, there is some range SNR and n that can provide improved performance in non-Gaussian communication channels. The decoder performance becomes worse for increasing values of n greater than 2 because, as the probability histogram mass on the incorrect side migrates away from the decision boundary, that is toward the −1 value, the secondary cause of BER degradation dominates the performance of the decoder.

The invention is directed to metric transformations, such as nth root transformations, of metrics in a noncoherent demodulating turbo decoding communication system, such as a PSK demodulating system, for matching non-Gaussian channel statistics to near Gaussian channel statistics by transforming the metrics inputs to the turbo decoder. In order to improve the robustness of the communication system against fading and multipath, the metric transformation operates on a non-Gaussian metric sequence originating from a noncoherent demodulator. Although this metric transformation can slightly degrade the BER performance in a benign Gaussian channel environment, an improvement is had in the most critical scenario, when the channel is faded. While the preferred form uses a square root transformation, other types of root transformations can be used, excepting the trivial cases of n=1 and n=∞ root transformations. Other non-root metric transformations could be used as well, such as logarithmic, exponential, and algebraic metric transformations. Those skilled in the art can make enhancements, improvements, and modifications to the invention, and these enhancements, improvements, and modifications may nonetheless fall within the spirit and scope of the following claims.

What is claimed is:

1. A turbo decoding communication system for communicating a data signal over a communication channel, the system comprising, a turbo encoder for encoding the data signal into an encoded signal, a modulator for generating a modulated signal from the encoded signal, [the modulated signal being communicated over the communication channel,]

a demodulator for demodulating the modulated signal into a demodulated signal providing non-Gaussian metrics, a transformer for transforming the non-Gaussian metrics into near Gaussian metrics, a turbo decoder for decoding the near Gaussian metrics into the data signal[, the turbo decoder decoding the near Gaussian metrics into the data signal] using a Gaussian characterization [for characterizing] *of* the communication channel, and a decoder reference for providing a Gaussian mean and a Gaussian standard deviation to the turbo decoder for decoding the near Gaussian metrics into the data signal, the Gaussian mean and Gaussian standard deviation being the Gaussian characterization.

2. The system of claim 1, wherein the system further comprises, a channel interleaver for interleaving the encoded signal, and a channel deinterleaver for deinterleaving the demodulated signal.

3. The system of claim 1 wherein, the demodulator is a noncoherent demodulator.

4. The system of claim 1 wherein, the communication channel is a non-Gaussian communication channel.

5. The system of claim 1 wherein, the data signal is communicated over the communication channel using phase shift keying signaling.

6. The system of claim 1 wherein, the Gaussian characterization is an Eb/No signal-to-noise ratio.

7. A turbo decoding communication system for communicating a data signal using phase shift keying (PSK) signaling over a non-Gaussian communication channel, the system comprising, a turbo encoder for encoding the data signal into an encoded signal, a PSK modulator for generating a PSK modulated signal from the encoded signal[, the PSK modulated signal being communicated over the non-Gaussian communication channel], a PSK demodulator for demodulating the PSK modulated signal into a PSK demodulated signal providing non-Gaussian metrics, an nth root transformer for transforming the non-Gaussian metrics into near Gaussian metrics where n does not equal one nor equal infinity, a turbo decoder for decoding the near Gaussian metrics into the data signal[, the turbo decoder decoding the near Gaussian metrics into the data signal] using a Gaussian characterization [for characterizing] *of* the communication channel, and a decoder reference for providing a Gaussian mean and a Gaussian standard deviation to the turbo decoder for decoding the near Gaussian metrics into the data signal, the Gaussian mean and Gaussian standard being the Gaussian characterization.

8. The system of claim 7, wherein the system further comprises, a channel interleaver for interleaving the encoded signal, and a channel deinterleaver for deinterleaving the demodulated signal.

9. The system of claim 7 wherein the nth root transformer is a square root transformer.

10. The system of claim 7 wherein the PSK signaling is binary PSK signaling.

11. The system of claim 7 wherein the PSK is differential coherent PSK signaling.

12. The system of claim 7 wherein, n defines the root of the nth root transformer, and n is a positive integer greater than one.

13. A turbo decoding communication system for communicating a data signal using differential coherent phase shift keying (DPSK) signaling over a non-Gaussian communication channel, the system comprising, a turbo encoder for encoding the data signal into an encoded signal, a DPSK modulator for generating a DPSK modulated signal from the encoded signal, [the DPSK modulated signal being communicated over the non-Gaussian communication channel,]

a DPSK demodulator for demodulating the DPSK modulated signal into a DPSK demodulated signal providing non-Gaussian metrics, and a square root transformer for transforming the non-Gaussian metrics into near Gaussian metrics where n does not equal one nor equal infinity, a turbo decoder for decoding the Gaussian metrics into the data signal[, the turbo decoder decoding the near Gaussian metrics into the data signal using] a Gaussian characterization [for characterizing] *of* the communication channel, and a decoder reference for providing a Gaussian mean and a Gaussian standard deviation to the turbo decoder for decoding the near Gaussian metrics into the data signal, the Gaussian mean and Gaussian standard deviation being the Suasion characterization.

14. The system of claim 13, wherein the system further comprises, a channel interleaver for interleaving the encoded signal, and a channel deinterleaver for deinterleaving the demodulated signal.

15. The system of claim 13, wherein the non-Gaussian communication channel fades the DPSK modulated signal over the non-Gaussian communication channel.

*16. A method for turbo decoding communication system for communicating a data signal over a communication channel, the method comprising:*

*encoding the data signal into an encoded signal with a turbo encoder;*

*generating a modulated signal from the encoded signal;*

*demodulating the modulated signal into a demodulated signal providing non-Gaussian metrics;*

*transforming the non-Gaussian metrics into near Gaussian metrics;*

*decoding the near Gaussian metrics into the data signal;*

*decoding the near Gaussian metrics into the data signal with a turbo decoder using a Gaussian characterization of the communication channel; and*

*providing a Gaussian mean and a Gaussian standard deviation with a decoder reference to the turbo decoder for decoding the near Gaussian metrics into the data signal,*

*wherein the Gaussian mean and Gaussian standard deviation being the Gaussian characterization.*

*17. The method of claim 16, wherein the method further comprises:*

*interleaving the encoded signal; and*

*deinterleaving the demodulated signal.*

*18. The method of claim 16, wherein the Gaussian characterization is an $E_b/N_o$ signal-to-noise ratio.*

*19. A method for turbo decoding a data signal using phase shift keying (PSK) signaling over a non-Gaussian communication channel, the method comprising:*

*encoding the data signal into an encoded signal;*

*generating a PSK modulated signal from the encoded signal;*

*demodulating the PSK modulated signal into a PSK demodulated signal providing non-Gaussian metrics;*

*transforming the non-Gaussian metrics into near Gaussian metrics with an nth root transformer, where n does not equal one nor equal infinity;*

*decoding the near Gaussian metrics into the data signal using a Gaussian characterization of the communication channel; and*

*providing a Gaussian mean and a Gaussian standard deviation for decoding the near Gaussian metrics into the data signal,*

*wherein the Gaussian mean and Gaussian standard being the Gaussian characterization.*

*20. The method of claim 19, wherein the method further comprises:*

*interleaving the encoded signal; and*

*deinterleaving the demodulated signal.*

*21. The method of claim 19, wherein the nth root transformer is a square root transformer.*

*22. The method of claim 19, wherein the PSK signaling is binary PSK signaling.*

*23. The method of claim 19, wherein the PSK is differential coherent PSK signaling.*

*24. The method of claim 19, wherein, n defines the root of the nth root transformer, and n is a positive integer greater than one.*

*25. A method for turbo decoding a data signal using differential coherent phase shift keying (DPSK) signaling over a non-Gaussian communication channel, the method comprising,*

*encoding the data signal into an encoded signal;*

*generating a DPSK modulated signal from the encoded signal;*

*demodulating the DPSK modulated signal into a DPSK demodulated signal;*

*providing non-Gaussian metrics from the DPSK demodulated signal and a square root transformer for transforming the non-Gaussian metrics into near Gaussian metrics where n does not equal one nor equal infinity;*

*decoding the Gaussian metrics into the data signal;*

*decoding the near Gaussian metrics into the data signal using a Gaussian characterization of the communication channel; and*

*providing a Gaussian mean and a Gaussian standard deviation with a decoder reference,*

*wherein the Gaussian mean and Gaussian standard deviation being the Gaussian characterization.*

*26. The method of claim 25, further comprising:*

*interleaving the encoded signal; and*

*deinterleaving the demodulated signal.*

*27. The method of claim 25, wherein the non-Gaussian communication channel fades the DPSK modulated signal over the non-Gaussian communication channel.*

* * * * *

UNITED STATES PATENT AND TRADEMARK OFFICE

CERTIFICATE OF CORRECTION

PATENT NO. : RE42,884 E
APPLICATION NO. : 12/289216
DATED : November 1, 2011
INVENTOR(S) : Wang et al.

It is certified that error appears in the above-identified patent and that said Letters Patent is hereby corrected as shown below:

Column 7, line 25, in Claim 6, delete "Eb/No" and insert -- $E_b/N_o$ --.

Column 8, line 26, in Claim 13, delete "Suasion" and insert -- [Suasion] *Gaussian* --.

Signed and Sealed this
Fifteenth Day of May, 2012

David J. Kappos

David J. Kappos
*Director of the United States Patent and Trademark Office*